United States Patent Office.

HENRY W. JOHNS, OF NEW YORK, N. Y.

WALL-PAPER, PAPER-BOARD, &c.

SPECIFICATION forming part of Letters Patent No. 300,374, dated June 17, 1884.

Application filed November 17, 1883. (No specimens.)

*To all whom it may concern:*

Be it known that I, HENRY W. JOHNS, a citizen of the United States, residing at New York, New York, have invented new and useful Improvements in Wall-Paper, Paper-Board, Tiles, &c., of which the following is a specification.

My invention relates to a novel production involving the use of asbestus.

It has for its object to produce a paper, or board, or sheets, slabs, or tiles from asbestus pulp, or pulp composed of asbestus and other suitable material, and having any suitable or desirable design or appearance given to the surface by embossing the same, or by the deposition thereon of asbestus in any suitable form, or by the deposition thereon of a suitable cement; and with this end in view my invention consists in the broad idea of a product having as its base asbestus solely, or of asbestus and any other suitable material, made into paper-board, slabs, cloth, or other fabric, tiles, or sheets, and embossed to produce a pleasing æsthetic effect, as will be hereinafter fully explained in detail.

In carrying out my invention I produce paper in rolls or sheets, or paper-board, slabs, or tiles, from a pulp composed of asbestus, or asbestus mixed with other suitable material; and upon the surface of the paper, paper-board, slabs, or tiles thus made I produce any desired design, either by embossing the same, (by employing any of the known agencies for producing embossed surfaces,) or by coating, depositing, or building up the design upon the surface. The design upon the surface of the body proper may be composed of asbestus alone, or asbestus mixed with any suitable material; or such design may be composed of a cement alone.

In some cases I may use any suitable foundation other than asbestus, or of which asbestus is a component part; and in such surface I superpose an embossed surface composed of asbestus or asbestus mixed with other suitable material, whereby I obtain a fire-proof and durable surface.

I am aware, of course, that ordinary paper has been embossed, and that designs have also been produced on ordinary paper bodies by printing, &c., and that clay and other plastic materials have been embossed, and I do not claim any such broad idea, the gist of my invention resting in the idea of the employment of asbestus solely, or in conjunction with other materials, in the production of paper, paper-board, slabs, tiles, &c., with embossed surfaces; and I do not wish to limit myself to any special or particular method or agency for producing the embossed surface, nor to any particular shade or color, as variations in such respects may be made without departing from the spirit of my invention.

What I claim as new, and desire to secure by Letters Patent, is—

Paper, paper-board, slabs, tiles, &c., having an embossed surface, when such paper, paper-board, slabs, tiles, &c., are produced wholly or in part from asbestus in any suitable form, substantially as hereinbefore fully explained.

In testimony whereof I have hereunto set my hand in the presence of two subscribing witnesses.

HENRY W. JOHNS.

Witnesses:
 WM. E. HAMILTON,
 R. J. HUNTER.